(12) United States Patent
Aske et al.

(10) Patent No.: US 10,125,584 B2
(45) Date of Patent: Nov. 13, 2018

(54) WELL CONTROL SYSTEM

(71) Applicant: Statoil Petroleum AS, Stavanger (NO)

(72) Inventors: Elvira Marie Bergheim Aske, Trondheim (NO); Morten Fredriksen, Jakobsli (NO); Alexey Pavlov, Porsgrunn (NO); Kjetil Fjalestad, Skien (NO); Dinesh Krishnamoorthy, Prosgrunn (NO); Petter Tøndel, Mosjøen (NO); Yilmaz Türkyilmaz, Lillestrøm (NO)

(73) Assignee: STATOIL PERTROLEUM AS, Stavanger (NO)

( * ) Notice: Subject to any disclaimer, the term of this patent is extended or adjusted under 35 U.S.C. 154(b) by 205 days.

(21) Appl. No.: 15/036,599

(22) PCT Filed: Nov. 14, 2013

(86) PCT No.: PCT/EP2013/073882
§ 371 (c)(1),
(2) Date: May 13, 2016

(87) PCT Pub. No.: WO2015/070913
PCT Pub. Date: May 21, 2015

(65) Prior Publication Data
US 2016/0290077 A1    Oct. 6, 2016

(51) Int. Cl.
| | |
|---|---|
| *E21B 43/12* | (2006.01) |
| *E21B 21/08* | (2006.01) |
| *E21B 34/06* | (2006.01) |
| *E21B 47/06* | (2012.01) |
| *G05B 15/02* | (2006.01) |

(52) U.S. Cl.
CPC ............ *E21B 43/128* (2013.01); *E21B 21/08* (2013.01); *E21B 34/06* (2013.01); *E21B 47/06* (2013.01); *E21B 47/065* (2013.01); *G05B 15/02* (2013.01)

(58) Field of Classification Search
CPC ........ E21B 43/128; E21B 34/16; E21B 21/08; E21B 47/10; E21B 47/06; E21B 34/03; E21B 47/065; G05B 15/02
See application file for complete search history.

(56) References Cited

U.S. PATENT DOCUMENTS

| | | | |
|---|---|---|---|
| 2004/0104027 A1* | 6/2004 | Rossi | ...................... E21B 43/12 |
| | | | 166/250.15 |
| 2008/0262736 A1 | 10/2008 | Thigpen et al. | |

(Continued)

*Primary Examiner* — Brad Harcourt
(74) *Attorney, Agent, or Firm* — Birch, Stewart, Kolasch & Birch, LLP

(57) ABSTRACT

A method for operating an electrical submersible pump, ESP, lifted well, the method comprising: measuring a characteristic of the well or a characteristic of a device associated with the well; generating a first control signal for instructing a change in the operation of the ESP; generating a second control signal for instructing a change in the operation of a further device associated with the well; wherein a degree of change in each of the first and second control signals is dependent on the outcome of the measuring and on a known effect caused by sending at least one of said first control signal to the ESP or said second control signal to the further device associated with the well; and sending the first control signal to the ESP and the second control signal to the further device associated with the well.

23 Claims, 7 Drawing Sheets

(56) References Cited

U.S. PATENT DOCUMENTS

2010/0295224 A1 8/2010 Ngueta et al.
2011/0061861 A1 3/2011 Flanders
2013/0175030 A1 7/2013 Ige et al.

* cited by examiner

WELL CONTROL SYSTEM

TECHNICAL FIELD

The invention relates to the field of production well operations and to control systems for production well operations.

BACKGROUND

The flow of gas and liquids in a production well takes place as a result of pressure in the reservoir. The naturally occurring pressure may be sufficient to lift the fluids to the surface. In addition to the natural flow of fluids, an artificial pressure may be added to increase the flow, or create a flow if the naturally occurring pressure is not sufficient to lift the fluids to the surface. The artificial pressure is also referred to as artificial lift. An electric submersible pump (ESP) is a downhole pump which can be used to create artificial lift. A system of multiple EPS lifted wells may be used, wherein the wells are connected to a common manifold.

SUMMARY

It is an object of the invention to optimize production from ESP lifted wells.

According to a first aspect of the invention, there is provided a method for operating an electrical submersible pump, ESP, lifted well, the method comprising: measuring a characteristic of the well or a characteristic of a device associated with the well, generating a first control signal for instructing a change in the operation of the ESP, generating a second control signal for instructing a change in the operation of a further device associated with the well, wherein a degree of change in each of the first and second control signals is dependent on the outcome of the measuring and on a known effect caused by sending at least one of said first control signal to the ESP or said second control signal to the further device associated with the well, and sending the first control signal to the ESP and the second control signal to the further device associated with the well.

The further device associated with the well may comprise any one of an ESP pump, a booster pump, a fluid injection system, a compressor, a valve, a well head choke, and an inflow control device. The characteristic of the well may comprise any of pressure, temperature, flow-rate, viscosity, density, water cut, reservoir inflow, transitions between oil and water continuous flow regimes, topside pressure. The characteristic of the device associated with the well may comprise any one of: pump motor temperature, pump motor current, pump vibration level, pump speed, production choke opening, fluid injection rate, motor power, pump operational envelope, intake or discharge pressure of the pump, intake and discharge temperatures of the pump.

The method may further comprise any of maximising oil production and minimising power consumption, minimising fluid injection, maximising profit. The method may further comprise maintaining the characteristics of the device associated with the well, or the operation of the ESP, or the characteristics of the well within an operational envelope determined by a plurality of operational parameters under varying well conditions. The method may further comprise maintaining the characteristics of the device associated with the well, or the operation of the ESP, or the characteristics of the well substantially at a predetermined value. The ESP lifted well may be part of a system comprising a plurality of ESP lifted wells and the ESP may be located in the ESP lifted well and the further well device may be located in a further ESP lifted well.

The method may further comprise determining a degree of change in each of the first and second control signals based on a predictive numerical model. The predictive numerical model may be based on any of a prediction of response to change of a well device operation, a prediction of an effect of introducing a new well, a prediction of an effect of shutting down a well, a prediction of an effect of a change in operation of a well device. The first and second control signals may be generated based on knowledge of how the operation of the ESP or the further well device will affect the well operation in the future.

According to a second aspect of the invention, there is provided a system for operating an electrical submersible pump, ESP, lifted well, the system comprising: at least one device associated with the well, a plurality of sensors arranged to measure a characteristic of the well or a characteristic of the at least one device associated with the well, a control device arranged to receive outputs of the plurality of sensors and arranged to carry out the method according to the first aspect of the invention.

The device associated with the well may comprises any one of an ESP pump, a booster pump, a fluid injection system, a compressor, a valve, a well head choke, and an inflow control device. The characteristic of the well may comprise any of pressure, temperature, flow-rate, viscosity, density, water cut, reservoir inflow, transitions between oil and water continuous flow regimes, topside pressure. The characteristic of the device associated with the well may comprise any one of: pump motor temperature, pump motor current, pump vibration level, pump speed, production choke, fluid injection rate, motor power, pump operational envelope, intake or discharge pressure of the pump. The control device may further be arranged to carry out any of maximising oil production and minimising power consumption, minimising fluid injection, maximising profit. The control device may further be arranged to: maintain the characteristics of the device associated with the well, or the operation of the ESP, or the characteristics of the well within an operational envelope determined by a plurality of operational parameters under varying well conditions.

The control device may further be arranged to: maintain the characteristics of the device associated with the well, or the operation of the ESP, or the characteristics of the well substantially at a predetermined value. The ESP lifted well may be part of a system comprising a plurality of ESP lifted wells and the ESP may be located in the ESP lifted well and the further well device may be located in a further ESP lifted well. The control device may further be arranged to determine a degree of change in each of the first and second control signals based on a predictive numerical model. The predictive numerical model may be based on any of a prediction of response to change of a well device operation, a prediction of an effect of introducing a new well, a prediction of an effect of shutting down a well, a prediction of an effect of a change in operation of a well device. The control device may further be arranged to generate the first and second control signals based on knowledge of how the operation of the ESP or the further well device will affect the well operation in the future.

According to a third aspect of the invention, there is provided a computer device comprising: a receiver for receiving measurements of a characteristic of the well or a characteristic of a device associated with the well, a processor for determining a first control signal for instructing a change in the operation of the ESP and for determining a second control signal for instructing a change in the operation of a further device associated with the well; and a transmitter for sending said first control signal to the ESP and for sending said second control signal to said further well device.

According to a fourth aspect of the invention, there is provided a computer program comprising non-transitory computer readable code which, when run on a computer device, causes the computer device to behave as a computer device according to the third aspect of the invention.

According to a fifth aspect of the invention, there is provided a computer program product comprising a non-transitory computer readable medium and a computer program according to the fourth aspect of the invention, wherein the computer program is stored on the non-transitory computer readable medium.

DETAILED DESCRIPTION

Figure 1:
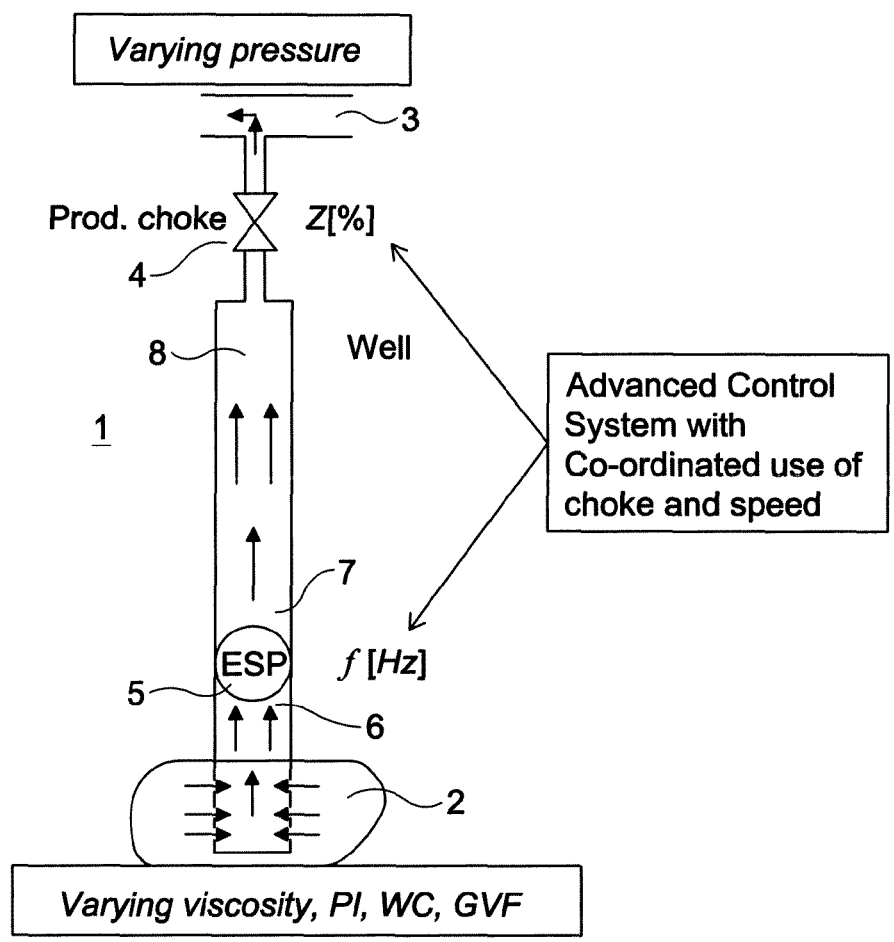
FIG. 1 illustrates schematically a single well.

Herein disclosed is a method for operating an electrical submersible pump, ESP, lifted well, the method comprising: measuring a characteristic of the well or a characteristic of a device associated with the well, generating a first control signal for instructing a change in the operation of the ESP, generating a second control signal for instructing a change in the operation of a further device associated with the well, wherein a degree of change in each of the first and second control signals is dependent on the outcome of the measuring and on a known effect caused by sending at least one of said first control signal to the ESP or said second control signal to the further device associated with the well, and sending the first control signal to the ESP and the second control signal to the further device associated with the well.

The method disclosed herein may take the available data from an entire well system into account together with all process and capacity constraints when monitoring, controlling and optimising production. The well system comprises a plurality of wells terminating into a common manifold. The conditions of one of the wells and the settings of the well devices in that well generally influence the conditions of the other wells in the well system via the common manifold or via the formation.

A production well or an injection well includes a plurality of well devices such as inflow control devices (ICD), autonomous ICDs, downstream units such as a booster pump, injection lines, compressors and valves. An action of any one of these devices will have a back-action onto the entire well system and will thereby also provide means for controlling the condition of the well system.

In response to the collected measurements, the control system may protect an ESP by activating an alarm to operators or by shutting down the ESP if certain ESP parameters are outside their operational constraints. However, a shutdown of the ESP gives rise to a loss in production and is likely to reduce the lifetime of the ESP. A more advanced control system as disclosed herein avoids ESP shutdown by keeping the ESP within its operational constraints. The control system maintains the production process within its constraints and at the same time maximizes production and minimizes cost under varying operational conditions The control system takes coordinated automatic action using all available controls, such as ESP speed and production choke, chemicals and water injections, booster pumps, etc, to compensate for changing operational conditions and to keep the ESP lifted well system in a safe and desired or optimal operation point. For production systems with multiple ESP lifted wells, the control system takes coordinated automatic actions using all available controls, such as ESP speed and production choke for each well, booster pumps, etc., in order to bring or keep the operation of the whole production system to a desired target or optimal state, such as to maximize production, minimize power consumption or minimize cost, while keeping all process parameters for individual wells and associated equipment within admissible ranges. The control system software further performs monitoring, optimization and control of the production system with one or several ESP lifted wells.

The control system is also arranged to predict future values of the controlled variables using the available measurements and dynamic models. Based on the predicted future values, specified optimization criteria and process and capacity constraints, the automatic control system determines the required changes, if necessary, of the controls (e.g. pump speed, production choke, fluid injections) in a coordinated manner. In this way, the control system maintains the operation of the whole production system, including ESPs and other devices associated with the well, e.g. booster pumps, within its operational constraints and, in addition or alternative to that, keeps controlled variables at specified set-points or brings them to their optimization targets according to the specified optimization criteria. The control system takes action pro-actively due to its prediction capabilities based on the use of dynamical models. Thus, control actions are taken before any constraint limit is violated. This reduces the number of safety shutdowns due to process constraints violation. Reduction of safety shutdowns itself contributes to the increased equipment lifetime and reduced non-production time.

The system can manipulate the process directly or specify set points to other controllers. The system can perform supporting calculations to implement soft sensors, which estimate process data indirectly based on measurements by physical sensors.

The control system is able to compensate for disturbances that affect the constraints without the need to measure the cause of the disturbance. For example, it is possible to handle changes to ESP load/current caused from varying viscosity, but the viscosity itself does not need to be measured to achieve this. The control system compensates for disturbances, e.g. variations in viscosity, WC, topside pressures, water, oil and gas inflow variations, start-ups and shut downs of wells producing to the same manifold, start-ups and shut downs of booster pumps, etc., and keeps the ESP lifted well system at a safe operation point. This simplifies the job of the operator and leads to safe, more regular and optimal operation.

The use of the advanced control system allows one to operate an ESP lifted well or a system of ESP lifted wells in a consistent and optimized way. For example, measurements and dynamic models like empirical step response coefficient models and/or physical models, are used to predict future well and pump behaviour and optimize the changes on the manipulated variables (using linear or quadratic programming algorithms) to keep the controlled variables at their set points or optimization targets and at the same time within given constraints. Typical constraints correspond to maximum and/or minimum limits of well pressures, pump motor temperature, intake- and discharge pressure for the pumps, vibration level, motor current, power, process capacity constraints, pump operational envelope (e.g. upthrust and downthrust constraints). The prediction capability makes the control system proactive and can therefore allow action to be taken before hitting operational constraints.

The control system is also capable of anticipating a future change to the system, for example, when a further well is added to the manifold of wells. The control system can calculate what the changes in well parameters will be as a result of the further well being added and change the control signals to devices associated with other wells in the manifold before such changes take place. The control system can also anticipate the effect of other changes, such the effect on the well head pressure in a first well of the manifold as a result of an ESP in a second well within the manifold being turned on.

Thus, the system can be used, for example, to keep the ESP lifted well system within its operational constraints to achieve safe operation of the system. This includes keeping pumps within its operational envelope and pressures, temperatures, flow rates and viscosities within acceptable range. By doing so, extended equipment lifetime may be achieved, or the ESP lifted well system performance may be optimised under varying operational conditions. For example, the oil production from the well system can be optimised under the presence of varying operational conditions and constraints on process variables and available process and equipment capacity. Doing this optimisation manually in the presence of varying operational conditions is a very challenging task for an operator. Varying operational conditions can be transitions between oil and water continuous flow regimes, variations of oil, water and gas inflow, variations of chemicals and water injections, topside pressure variations, influence of inflow control devices.

The control system achieves a more optimal operation of the whole production system by considering the ESP lifted well system as a whole and using a single integrated process, rather than individual sub-processes and by coordinating all available controls to bring and hold the system the system at a safe and optimal operation point within the process constraints. All the available functionalities are part of the same software system, thus reducing complexity and integration issues. The operation of the ESP production system is simplified, which leads to reduced competence and experience requirements on operators, and contributes to a more stable, safe and optimal production system. The system can operate with smaller margins with respect to process and capacity constraints without violating the constraints under changing operating conditions, which enables increased production. The system can take any necessary action early due to its prediction capabilities by using dynamic models. This reduces the number of safety shutdowns caused by violation of process or capacity constraints. This also leads to reduced non-production time and is likely to increase equipment (ESP) run-life.

The system is very flexible in terms of configuration, with varying constraints with different priorities, and the control system can therefore be customized to the ESP lifted well system that it should control. The control system is implemented in one unit that is compatible with most lift equipment and vendors. An implementation in one unit is also likely to reduce integration costs.

A first example of a configuration using the control system disclosed herein is a single ESP lifted well, whereby the control system is arranged to control both the ESP and the well head choke in a coordinated manner. The control system anticipates the back-action of the well head choke onto the ESP and the well and vice-versa and thereby provides an alternative to a reactive control method, such as closed loop control, whereby the ESP settings are adapted in response to a change in well head choke after a back-action takes effect.

A second example of a configuration using the control system disclosed herein is a single ESP lifted well, whereby the control system is arranged to control the ESP, the well head choke and a fluid injection system in a coordinated manner.

A third example of a configuration using the control system disclosed herein is a production system with multiple ESP lifted wells producing to a common manifold, whereby the control system is arranged to control the ESP, well head choke and fluid injection system of at least two of the wells, and also to control a booster pump in a coordinated manner.

FIG. 1 illustrates an example of an ESP lifted well (1) with process and capacity constraints. The well extends upwards from a reservoir (2) to an outlet pipe (3). For one ESP lifted well (1), the control system automatically manipulates the opening of the production choke (4) and the frequency of the ESP (5) in a coordinated manner to keep the ESP within its operating envelope between upthrust and downthrust. Within the operating envelope, the ESP intake pressure (6) within the well below the ESP is kept above a specified limit to avoid solids production, and the ESP discharge pressure (7) within the well above the ESP is kept below the maximal limit to satisfy process constraints. Further, the well-head pressure (8) is kept between maximum and minimum limits, while the ESP motor temperature, current and ESP vibration level is kept below specified thresholds.

The ESP frequency can vary within specified maximum and minimum limits. In addition to that, the control system optimizes production within these constraints and available power under varying operating conditions. Water cut (WC), gas volume fraction (GVF), inflow performance index (P1), and viscosity can vary during operation due to changes in reservoir conditions, effects inflow control devices, effects of restricting the flow from a branch of a multilateral well, possible injection of chemicals and water. Start up or shut down of other wells producing to the same manifold, start-up/shut down of a booster pump downstream the production choke and other aspects create varying top-side pressure disturbances.

Figure 2:
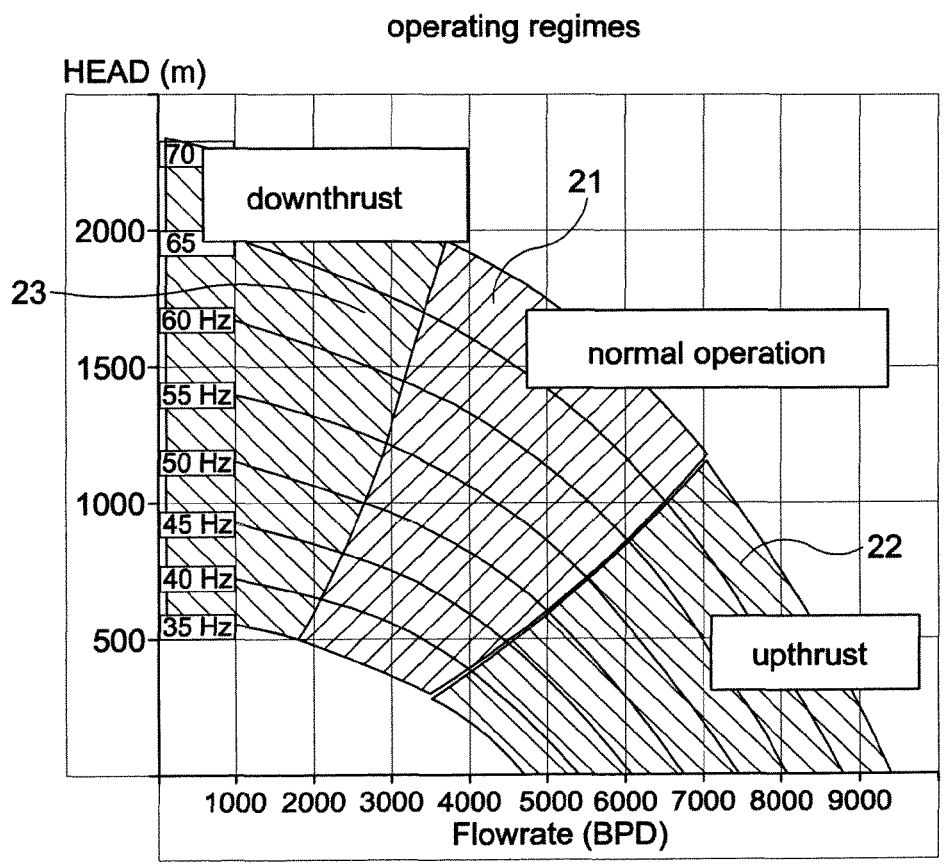
FIG. 2 illustrates a diagram of an operating envelope.

FIG. 2 is a diagram illustrating the operating envelope for an ESP. The horizontal axis corresponds to flowrate (in BPD) and the vertical axis corresponds to Head (in m). The normal operation window (21) is a region of the diagram between upthrust (22) and downthrust (23).

Figure 3:
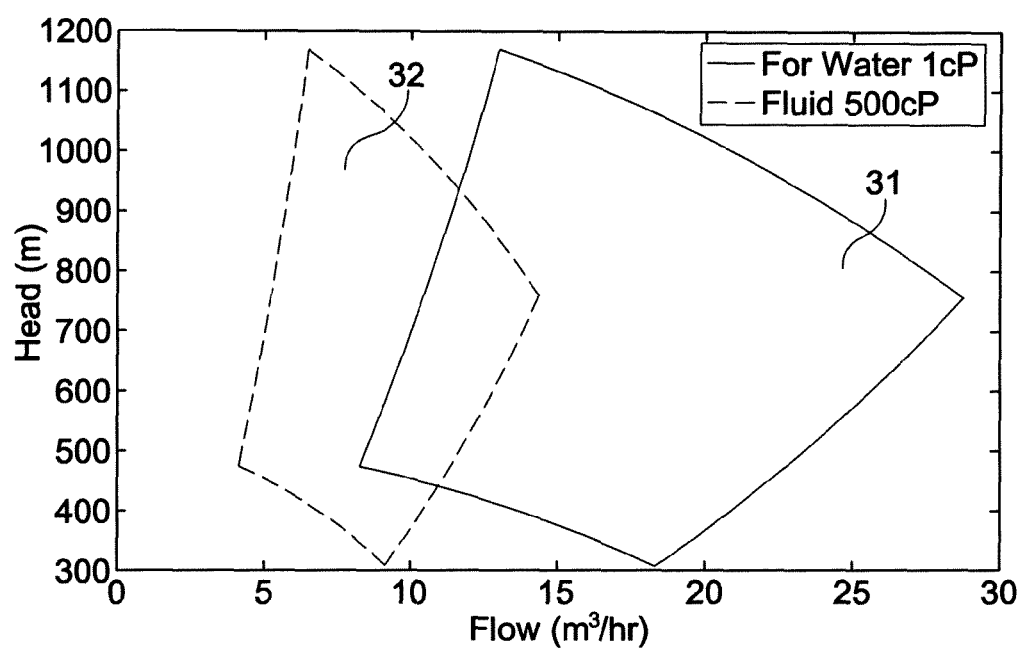
FIG. 3 illustrates a diagram showing a shift of an operating envelope.

FIG. 3 is a diagram illustrating the effect of varying operational constraints on the operating envelope. The vertical axis is Head (m) and the horizontal axis is flow (m$^3$/hr). The result of a variation in viscosity, the operating envelope shifts. Two operational envelopes are illustrated, for viscosities of 1 cp (reference number 31), corresponding to water, and 500 cP (32), corresponding to a fluid which is different from water. The control system is able to respond to the shift of the operational envelope, possibly without a direct measurement of the viscosity.

Figure 4:
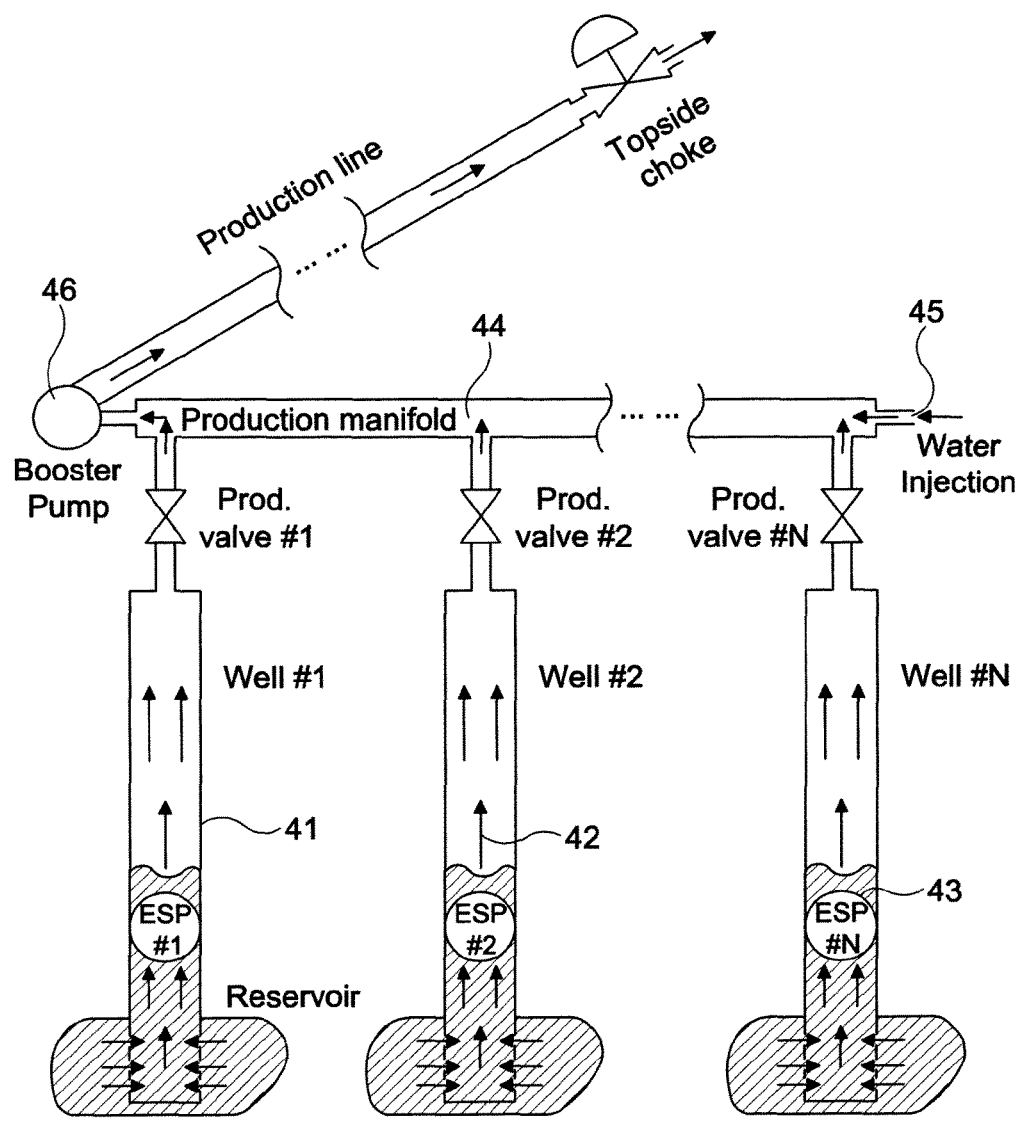
FIG. 4 illustrates schematically a plurality of wells connected to a common manifold.

FIG. 4 illustrates an example of a system with multiple ESP lifted wells (41, 42, 43) producing to the same manifold (44) with additional water injection (45) and a booster pump (46). Start-up or shut down of one of the wells or booster pumps, changes in water injection affect all other wells and booster pumps via the manifold. The same corresponds to any other change of production in any of the wells. The control system achieves optimal operation under varying conditions. For viscous oil, transitions between oil-continuous and water-continuous production that occurs around the inversion point generally cause large step changes in ESP performance and in the overall production process. Without interactions from the control system, these changes can bring the ESP outside of its operating envelope. Changes in viscosity will also affect the operation. All the other wells are dynamically linked to the well where the inversion takes place. The control system is arranged to handle such changes in operating conditions automatically.

Figure 5:
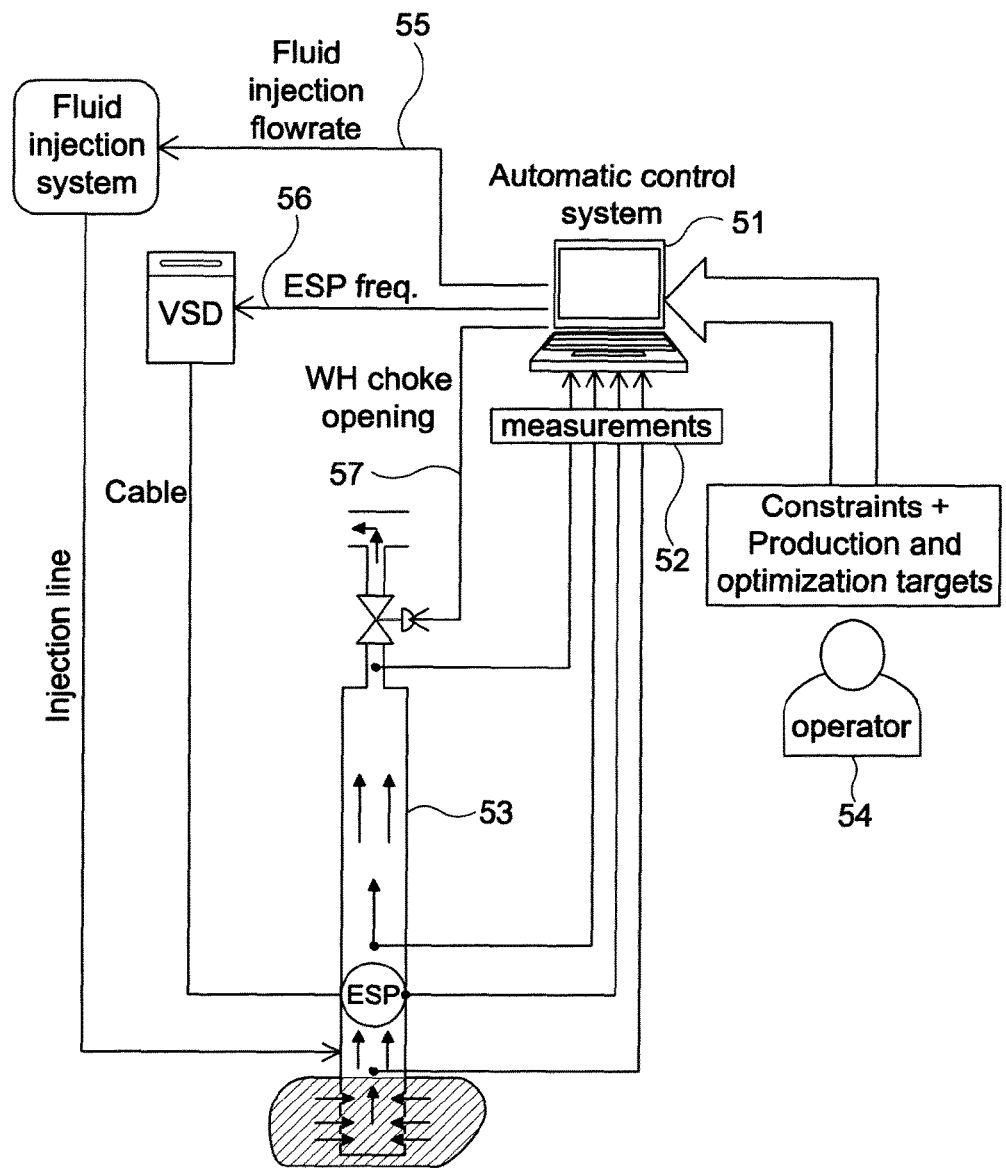
FIG. 5 is a flow diagram of a control system.

FIG. 5 illustrates an automatic control system 51 which receives a plurality of measurements 52 from a well 53. An operator 54 sets the constraints of the production process at the automatic control system, together with production and optimization targets. The control system generates control signals for controlling the fluid injection rate 55, the ESP frequency 56 and the well head choke opening 57.

Figure 6:
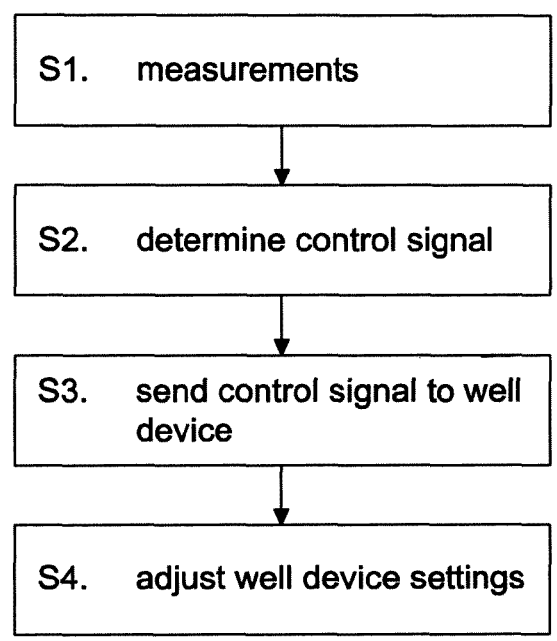
FIG. 6 is a flow diagram of a control method

FIG. 6 is a flow diagram showing exemplary steps for controlling a well. The following numbering corresponds to that of FIG. 6:

S1. Measurements are taken of a characteristic of the well and/or well devices.

S2. Based on the measurements, a control signal is determined for keeping the well devices within their operational envelope.

S3. The control signal is sent to the appropriate well device.

S4. The settings of the well device are adjusted based on the control signal.

The steps of measuring, determining control signals, and adjusting may be performed periodically or continuously during operation of the well.

Figure 7:
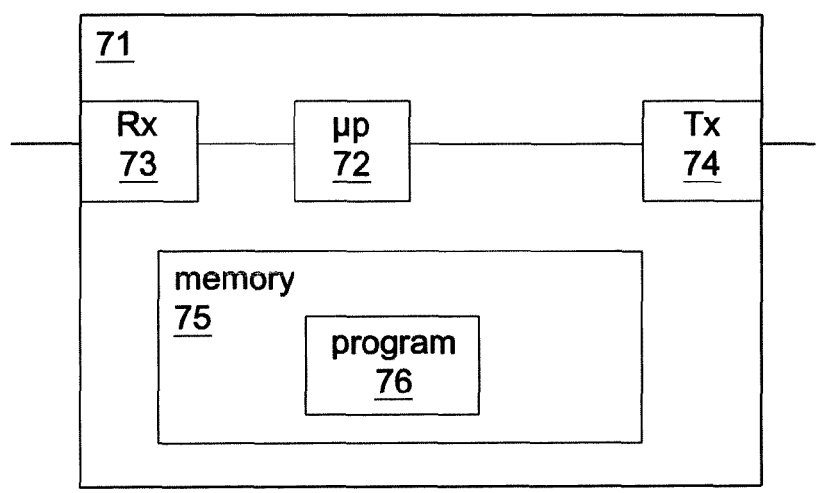
FIG. 7 illustrates schematically in a block diagram an exemplary computer device.

FIG. 7 illustrates schematically in a block diagram a computer device (71) that is arranged to control the well. The computer device is provided with a processor (72) and a receiver (73) for receiving measurements. On the basis of the received measurements, the processor determines a control signal for an appropriate well device. A transmitter (74) is provided for sending control signals to the well devices.

A non-transitory computer readable medium in the form of a memory (75) may also be provided that can be used to store data. It may also be used to store a computer program (76) which, when executed by the processor, causes the computer device to behave as described above.

It will be appreciated by a person of skill in the art that various modifications may be made to the above described embodiments without departing from the scope of the present disclosure. Different embodiments have been described above, but the skilled person will readily be able to devise other options for controlling an ESP lifted well.

The invention claimed is:

1. A method for operating an electrical submersible pump, ESP, lifted well, the method comprising:
   measuring a characteristic of the well or a characteristic of a device associated with the well;
   predicting a future value of the characteristic using the measured characteristic and dynamic models;
   generating a first control signal for instructing a change in the operation of the ESP;
   generating a second control signal for instructing a change in the operation of a further device associated with the well;
   wherein a degree of change in each of the first and second control signals is dependent on the future value and on a known effect caused by sending at least one of said first control signal to the ESP or said second control signal to the further device associated with the well; and
   sending the first control signal to the ESP and the second control signal to the further device associated with the well.

2. The method according to claim 1, wherein the further device associated with the well comprises any one of an ESP pump, a booster pump, a fluid injection system, a compressor, a valve, a well head choke, and an inflow control device.

3. The method according to claim 1, wherein the characteristic of the well comprises any of pressure, temperature, flow-rate, viscosity, density, water cut, reservoir inflow, transitions between oil and water continuous flow regimes, topside pressure.

4. The method according to claim 1, wherein the characteristic of the device associated with the well comprises any one of: pump motor temperature, pump motor current, pump vibration level, pump speed, production choke opening, fluid injection rate, motor power, pump operational envelope, intake or discharge pressure of the pump, intake and discharge temperatures of the pump.

5. The method according to claim 1, wherein the method further comprises any of maximising oil production and minimising power consumption, minimising fluid injection, maximising profit.

6. The method according to claim 1, further comprising:
   maintaining the characteristics of the device associated with the well, or the operation of the ESP, or the characteristics of the well within an operational envelope determined by a plurality of operational parameters under varying well conditions.

7. The method according to claim 1, further comprising:
   maintaining the characteristics of the device associated with the well, or the operation of the ESP, or the characteristics of the well substantially at a predetermined value.

8. The method according to claim 1, wherein the ESP lifted well is part of a system comprising a plurality of ESP lifted wells and wherein the ESP is located in the ESP lifted well and wherein the further well device is located in a further ESP lifted well.

9. The method according to claim 1, further comprising determining a degree of change in each of the first and second control signals based on a predictive numerical model.

10. The method according to claim 9, wherein the predictive numerical model is based on any of a prediction of response to change of a well device operation, a prediction of an effect of introducing a new well, a prediction of an effect of shutting down a well, a prediction of an effect of a change in operation of a well device.

11. The method according to claim 1, wherein the first and second control signals are generated based on knowledge of how the operation of the ESP or the further well device will affect the well operation in the future.

12. A computer program product comprising a non-transitory computer readable storage medium having computer-executable program codes stored therein, the computer-executable program codes being configured to, when run on a computer device, cause the computer device to perform the method according to claim 1.

13. A system for operating an electrical submersible pump, ESP, lifted well, the system comprising:
at least one device associated with the well;
a plurality of sensors arranged to measure a characteristic of the well or a characteristic of the at least one device associated with the well;
a control device arranged to receive outputs of the plurality of sensors and arranged to carry out the method of claim 1.

14. The system of claim 13, wherein the device associated with the well comprises any one of an ESP pump, a booster pump, a fluid injection system, a compressor, a valve, a well head choke, and an inflow control device.

15. The system of claim 13, wherein the characteristic of the well comprises any of pressure, temperature, flow-rate, viscosity, density, water cut, reservoir inflow, transitions between oil and water continuous flow regimes, topside pressure.

16. The system of claim 13, wherein the characteristic of the device associated with the well comprises any one of: pump motor temperature, pump motor current, pump vibration level, pump speed, production choke opening, fluid injection rate, motor power, pump operational envelope, intake or discharge pressure of the pump, intake and discharge temperatures of the pump.

17. The system according to claim 13, wherein the control device is further arranged to carry out any of maximising oil production and minimising power consumption, minimising fluid injection, maximising profit.

18. The system according to claim 13, wherein the control device is further arranged to: maintain the characteristics of the device associated with the well, or the operation of the ESP, or the characteristics of the well within an operational envelope determined by a plurality of operational parameters under varying well conditions.

19. The system according to claim 13, wherein the control device is further arranged to: maintain the characteristics of the device associated with the well, or the operation of the ESP, or the characteristics of the well substantially at a predetermined value.

20. The system according to claim 13, wherein the ESP lifted well is part of a system comprising a plurality of ESP lifted wells and wherein the ESP is located in the ESP lifted well and wherein the further well device is located in a further ESP lifted well.

21. The system according to claim 13, wherein the control device is further arranged to determine a degree of change in each of the first and second control signals based on a predictive numerical model.

22. The system according to claim 21, wherein the predictive numerical model is based on any of a prediction of response to change of a well device operation, a prediction of an effect of introducing a new well, a prediction of an effect of shutting down a well, a prediction of an effect of a change in operation of a well device.

23. The system according to claim 13, wherein the control device is further arranged to generate the first and second control signals based on knowledge of how the operation of the ESP or the further well device will affect the well operation in the future.

* * * * *